United States Patent
Watanabe

[11] Patent Number: 5,867,896
[45] Date of Patent: *Feb. 9, 1999

[54] METHOD FOR PROCESSING A SHIELDED CABLE

[75] Inventor: Kunihiko Watanabe, Yokkaichi, Japan

[73] Assignee: Sumitomo Wiring Systems, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 600,748

[22] Filed: Feb. 13, 1996

[30] Foreign Application Priority Data

Feb. 15, 1995  [JP]  Japan .................................... 7-026924

[51] Int. Cl.$^6$ ................................................. H01B 13/20
[52] U.S. Cl. ................................. 29/828; 29/825; 81/9.51
[58] Field of Search ..................... 29/825, 828; 81/9.51

[56] References Cited

U.S. PATENT DOCUMENTS

| | | | |
|---|---|---|---|
| 3,815,449 | 6/1974 | Folkenroth et al. | 81/9.51 |
| 3,853,156 | 12/1974 | Folkenroth et al. | 81/9.51 X |
| 4,043,362 | 8/1977 | Senior et al. | 81/9.51 X |
| 4,519,131 | 5/1985 | Starnes, Jr. et al. | 29/825 |

FOREIGN PATENT DOCUMENTS

| | | | |
|---|---|---|---|
| 2-250617 | 10/1990 | Japan | 81/9.51 |
| 3-226212 | 10/1991 | Japan | 81/9.51 |

*Primary Examiner*—Carl J. Arbes
*Attorney, Agent, or Firm*—Jordan B. Bierman; Bierman, Muserlian and Lucas

[57] ABSTRACT

To readily and safely process the end of a transverse wind shielded cable 1 with simple equipment without damaging the surfaces of the drain wires, the drain wires are caused to expand roughly into the shape of a football. The expanded drain wires are divided by a plate which may be rotated about its axis to widen the separation, thereby exposing the cores of the cable.

9 Claims, 10 Drawing Sheets

METHOD FOR PROCESSING A SHIELDED CABLE

This Application claims the priority of Japanese Application 7/26924, filed Feb. 15, 1995.

The present Invention relates to a method for processing an end of a shielded cable, with particular relevance to a shielded cable of transverse wind type.

BACKGROUND OF THE INVENTION

In general, a shielded cable comprises a plurality of braided cores having a large number of drain wires wound therearound. The combination is covered with an insulating sheath. Transversely wound cable has linearly extending drain wires twisted circumferentially around the cores. A variety of methods and apparatuses for, e.g. peeling the sheath at an end of such transversely wound shielded cable and separating the cores from the drain wires, are known.

For example, Japanese Unexamined Patent Publication 1/177810 discloses a method wherein the shielded cable is peeled to expose the drain wires, which are than brushed; however, the surface of the drain wires needs to be brushed many times. As a result, the surfaces of the drain wires are likely to be damaged or the plating may be abraded off.

Further, Japanese Unexamined Patent Publication 64/81608 and 64/26316 disclose methods for processing drain wires using pressurized air. These devices necessitate large equipment for supplying the pressurized air, leading to increased cost and space requirements.

It is desirable to easily and securely process the end of the shielded cable using simple equipment without damaging the surfaces of the drain wires. However, the art disclosed in the aforementioned publications cannot meet this requirement. Therefore, it is an object of the present Invention to provide an improved method for processing the shielded cable without damaging the surfaces of drain wires, in particular by the use of simple equipment.

SUMMARY OF THE INVENTION

According to the Invention, there is provided a method for processing a shielded—in particular transversely wound—cable comprising (1) cutting the sheath of the cable;

(2) peeling the cut sheath to expose the drain wires;

(3) loosening the braid of the exposed drain wires to move the drain wires apart from at least one core; and (4) separating the core from the drain wires.

According to a preferred embodiment of the Invention, at least one plate member is inserted lengthwise between the expanded drain wires. The plate member is then rotated about an axis normal to the shielded cable, thereby separating the drain wires radially to expose the core(s). It has been found especially desirable to insert two plate members from opposite sides. It is most preferred to thereafter separate the exposed core and drain wires from each other.

According to another desirable embodiment, the cut sheath at one side of the exposed core and drain wires (the scrap sheath) remains thereon, and the core and drain wires are caused to buckle and expand by moving the scrap sheath toward the sheath on the other side of the exposed core and drain wires, thereby causing them to bulge radially. Advantageously, the expanded drain wires are held, the cores are separated from the drain wires, and the core is cut to a predetermined length. It is also preferable that the drain wires be braided after separation.

As a result of the implementation of the present Invention, the drain wires are split in one step, thereby exposing the cores. Accordingly, the end of the shielded cable can be easily and safely processed without damage. Further, since the cores are exposed by the use of the plate member only, the equipment necessary can be quite small.

BRIEF DESCRIPTION OF THE DRAWINGS

In the accompanying drawings, constituting a part hereof and in which like reference characters indicate like parts.

DETAILED DESCRIPTION OF THE INVENTION

Figure 1:
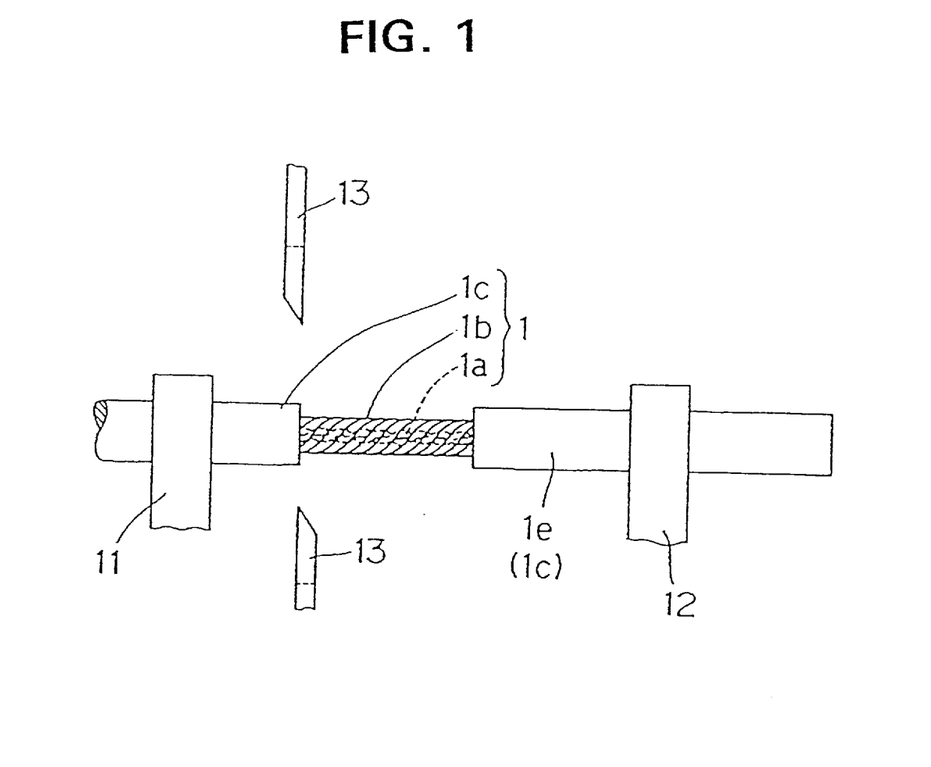
FIG. 1 is a schematic front view showing the cable wherein the sheath has been peeled off and the drain wires and cores exposed.

With reference to FIG. 1, there are provided fixed clamp 11 and movable clamp 12, which are capable of tightly holding transversely wound shielded cable 1. Shielded cable 1 consists of two braided cores 1a, drain wires 1b twisted around the outer surface of cores 1a, and sheath 1c surrounding drain wires 1b. Fixed clamp 11 tightly holds the body of shielded cable 1 in a specified position after the sheath is peeled off. Movable clamp 12 is adapted for movement toward and away from fixed clamp 11 and is also rotatable about the axis of shielded cable 1. Movable clamp 12 may be replaced, for example, by a hand tool such as pliers or pincers.

In operation, the body of shielded cable 1 is held by fixed clamp 11, and the end is held by movable clamp 12. By moving clamp 12 away from the fixed clamp 11, tension is created in shielded cable 1. In this condition, a pair of V-shaped peeling blades 13, opposed to each other in a direction normal to the axis of shielded cable 1, are moved toward each other to cut sheath 1c. Thereafter, clamp 12 moves away from fixed clamp 11 to expose drain wires 1b. Peeling blades 13 may be replaced by cutters or the peeling device as disclosed, for example, in Japanese Unexamined Patent Publication No. 64-26316. As shown in FIG. 1, scrap sheath 1e remains; in other words, scrap sheath 1e is not completely separated from shielded cable 1. It will be appreciated that sheath 1c may, if desired, be cut before shielded cable 1 is gripped by clamps 11 and 12.

Figure 2:
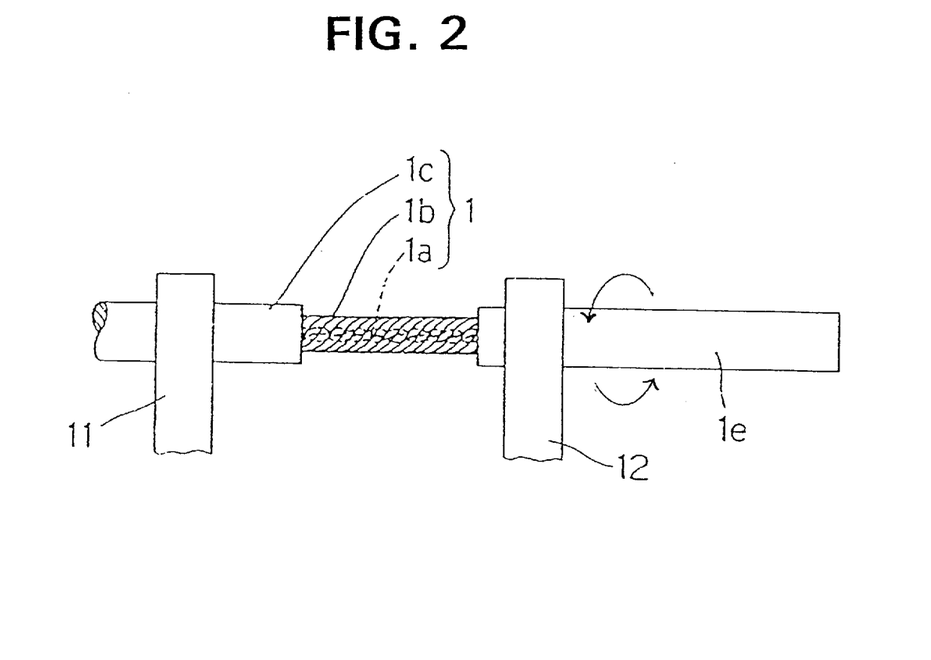
FIG. 2 is a schematic front view indicating the manner in which the drain wire is expanded.
Figure 3:
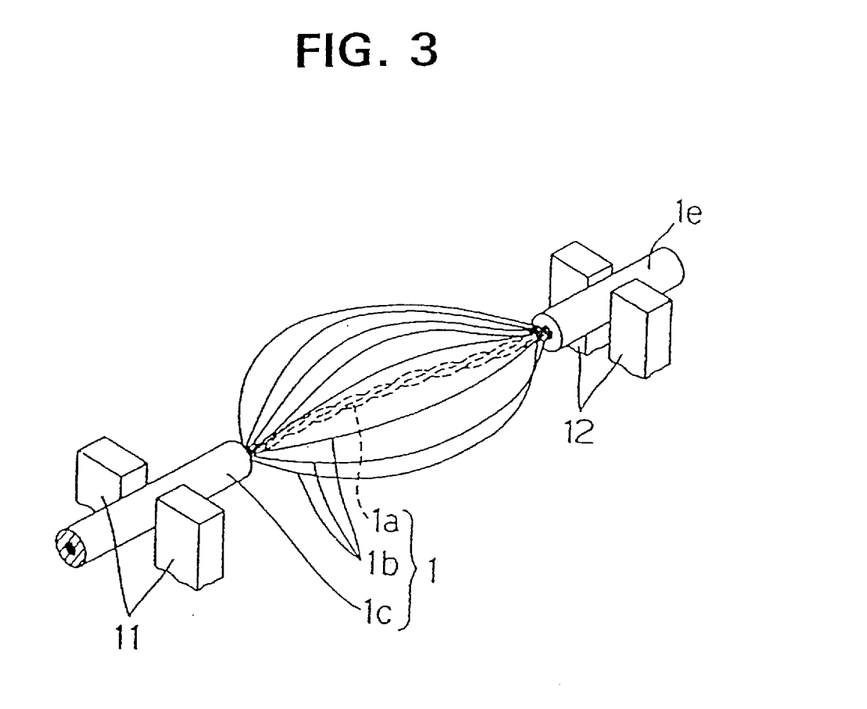
FIG. 3 is a perspective view of the drain wires expanded as a result of the step of FIG. 2.

With reference to FIG. 2, drain wires 1b are loosened and expanded radially by rotating movable clamp 12 in the direction opposite to the twisted direction of drain wires 1b. The amount of rotation depends on the nature of the windings, but a few rotations will generally be sufficient. As a result, drain wires 1b expand roughly into the shape of a football as shown in FIG. 3.

Figure 4:
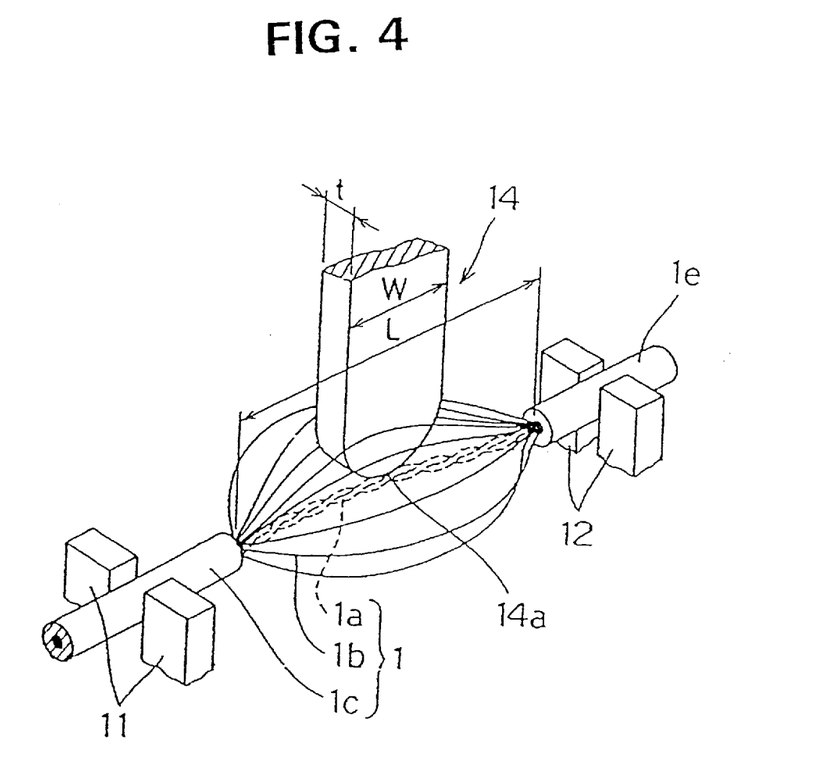
FIGS. 4 and 5 are perspective views showing the plate exposing the cores by separation of the drain wires.

With reference to FIG. 4, plate 14 is inserted between expanded drain wires 1b to separate cores 1a from drain wires 1b. Plate 14 is of, e.g. metal or relatively hard resin. The edges of plate member 14 are beveled to prevent scratching of drain wires 1b. Further, arcuate portion 14a is at the leading end of plate member 14 to facilitate the insertion.

Plate 14 has width W (e.g. 15 mm) which is shorter than length L (e.g. 30 mm) of the exposed drain wires along the longitudinal direction of shielded cable 1, and has thickness t (e.g. 2 mm) such that drain wires 1b are unlikely to be scratched.

Figure 5:
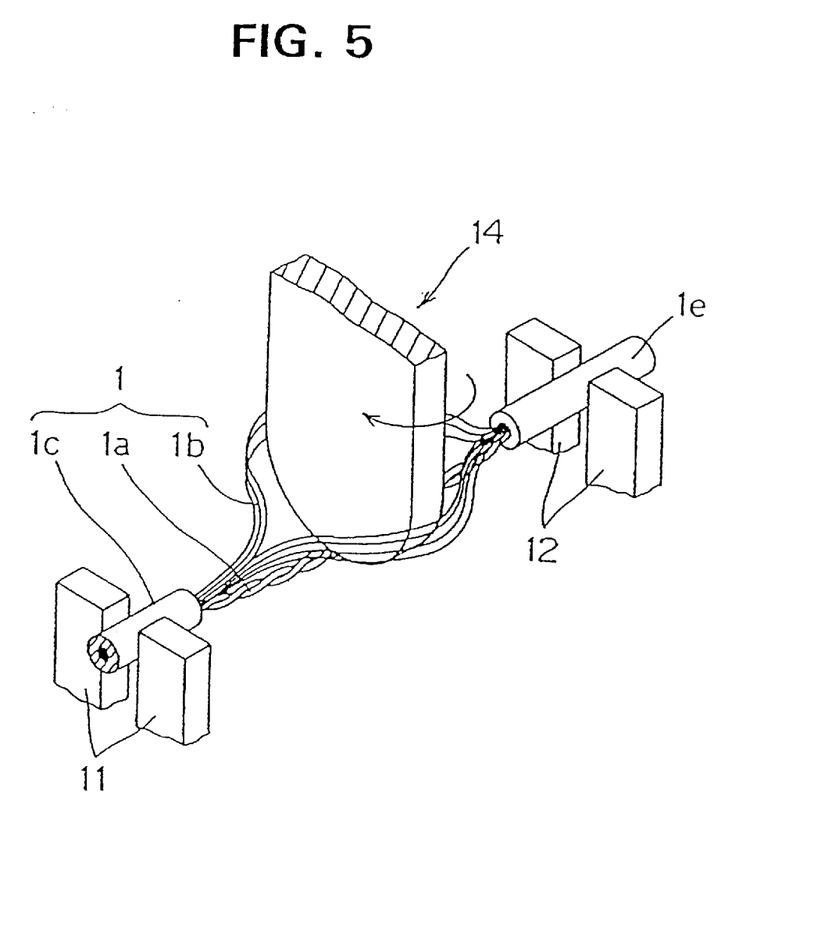

As shown in FIG. 4, the widthwise direction of plate 14 is aligned with the longitudinal direction of drain wires 1b and arcuate portion 14a of plate 14 is inserted between the expanded portions of drain wires 1b. Thereafter, as shown in FIG. 5, plate 14 is rotated approximately 90° about an axis normal to shielded cable 1. As a result, drain wires 1b undergo plastic deformation so that they are split with respect to the widthwise direction of plate member 14. When plate 14 is withdrawn, after rotation, a space remains where cores 1a are exposed. Thus, drain wires 1b expand in the rough shape of a football and are radially divided in one step by the rotation of plate member 14 inserted between drain wires 1b, thereby exposing the cores 1a.

Figure 6:
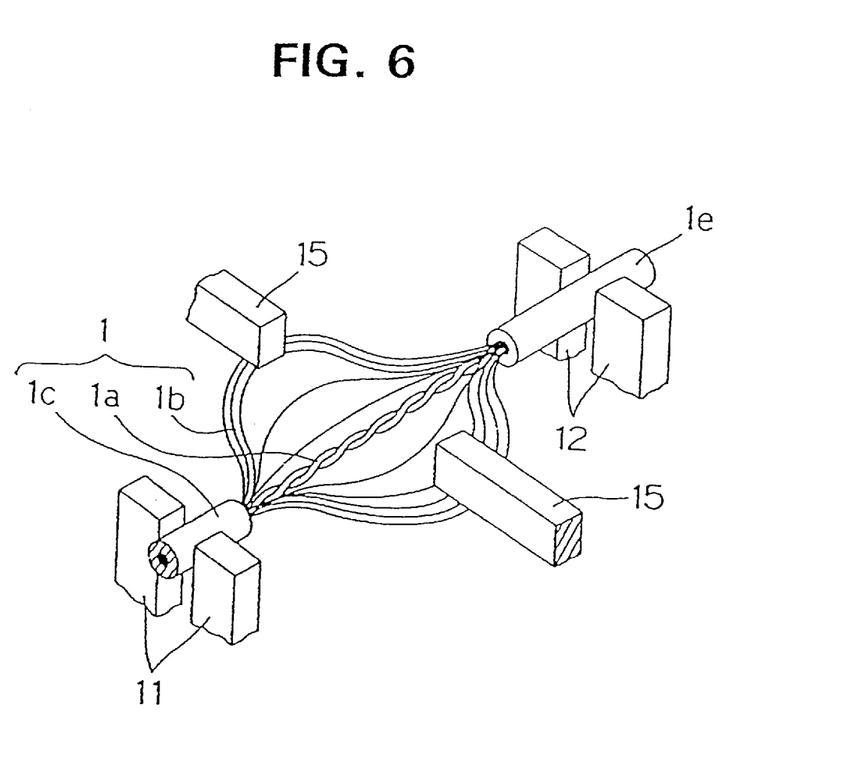
FIGS. 6 to 9 are perspective views showing a separation of the core and drain wires from each other and from the scrap sheath.
Figure 7:
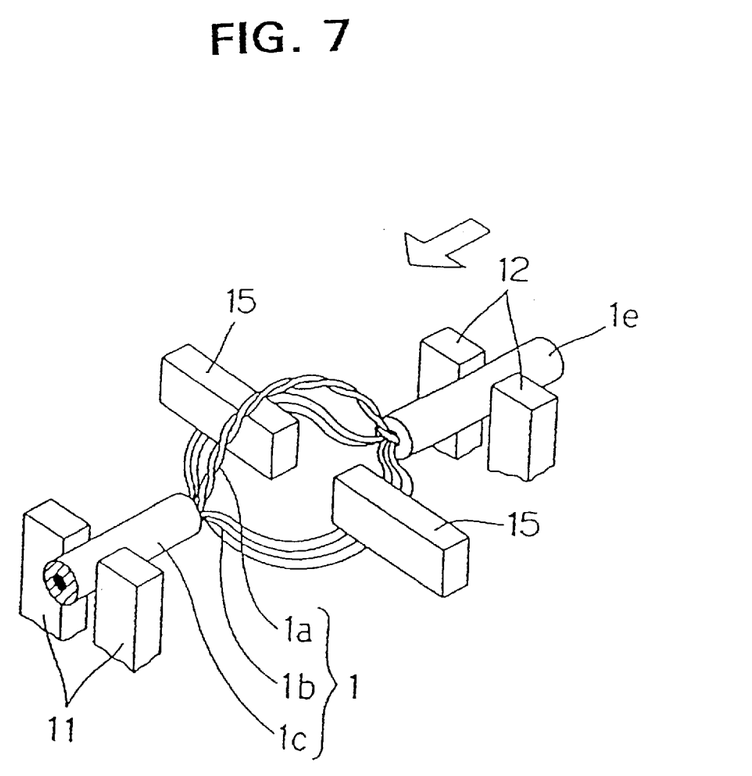

With reference to FIGS. 6 and 7, bulging portions of separated drain wires 1b are pressed by a pair of clamping claws 15 to separate exposed cores 1a from drain wires 1b. In this condition, movable clamp 12 is moved toward fixed clamp 11. As a result, cores 1a are buckled and curved so as to bulge in a direction different from—in particular normal to—the bulging directions of drain wires 1b. Hence, cores 1a are buckled in one step by moving scrap sheath 1e toward sheath 1c thereby causing cores 1a to bulge radially and separate from drain wires 1b.

Figure 8:
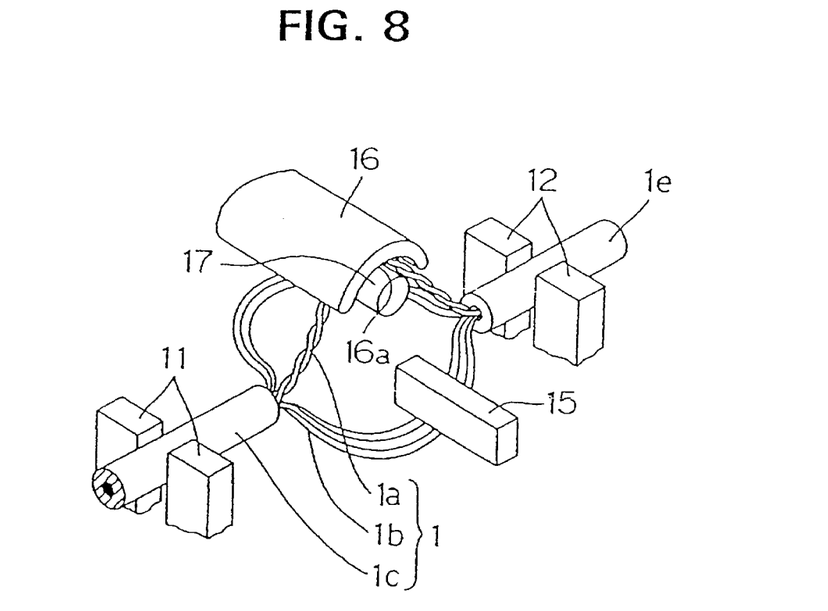
Figure 9:
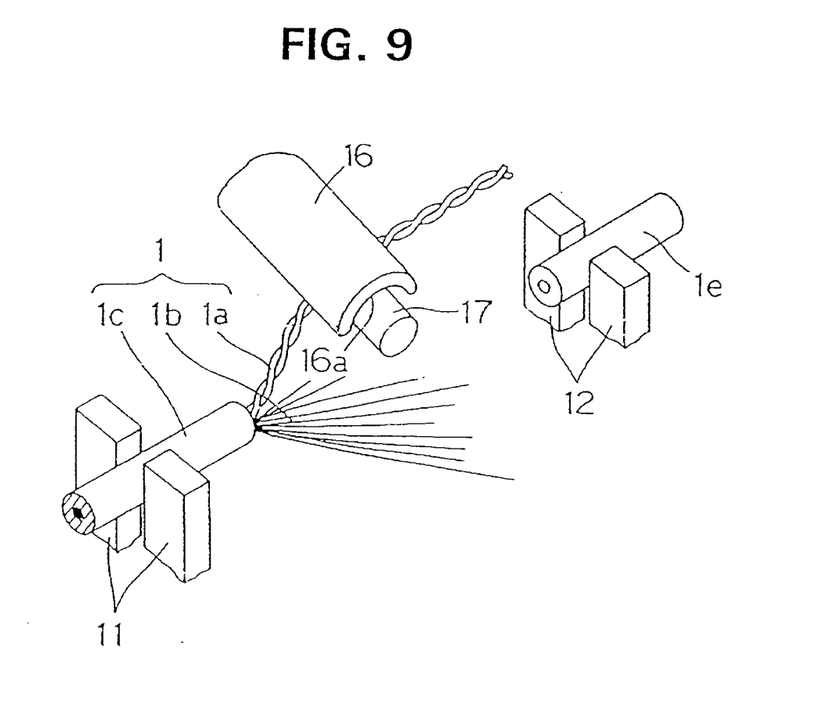

In the next step, bulging cores 1a are held between pressing member 16 having an arcuate cross section and bar 17 facing the inner surface thereof. As shown in FIG. 9, cores 1a, as well as the drain wires 1b, are pulled out of scrap sheath 1e. Both pressing member 16 and bar 17 are preferably made of metal and pressing member 16 is beveled at its edges so as not to scratch cores 1a. Alternatively, pliers having grips covered with rubber may be used instead of pressing member 16 and bar 17.

Figure 10:
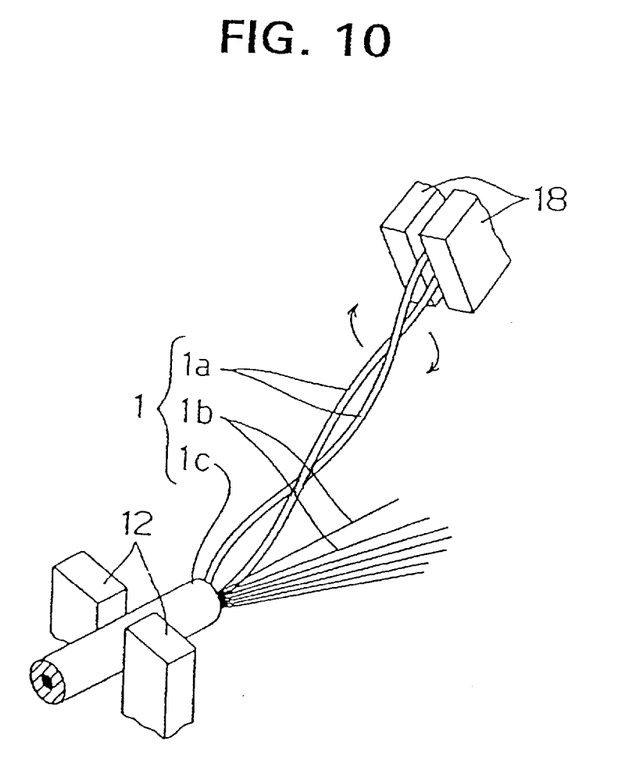
FIG. 10 is a perspective view showing the loosening of the core.
Figure 11:
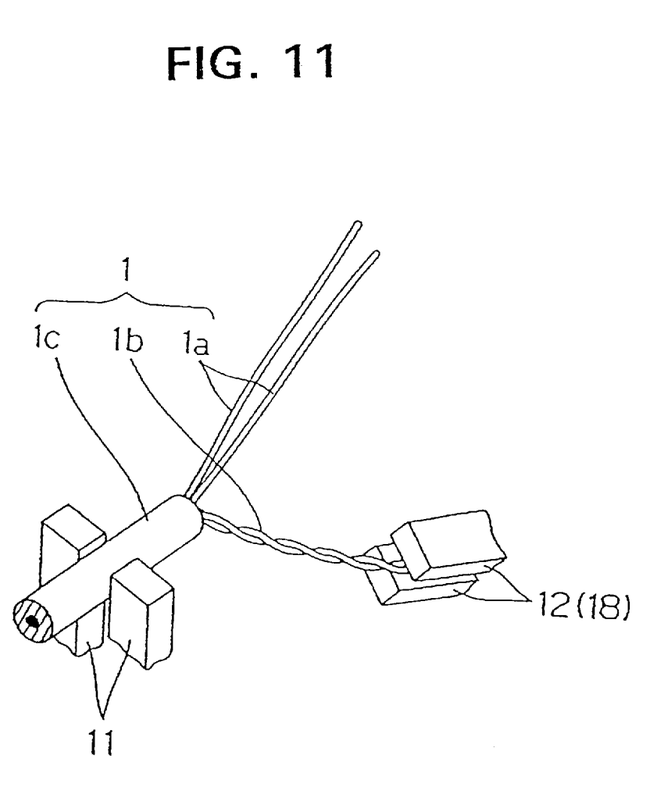
FIG. 11 is a perspective view showing the braiding of the drain wire.

With reference to FIG. 10, separated cores 1a are twisted in a direction opposite to their braided direction, thereby being separated from each other. This can be accomplished by rotatable clamp 18; alternatively, cores 1a may be held by movable clamp 12 and be loosened by rotation thereof. With reference to FIG. 11, drain wires 1b, which have been separated from cores 1a, are twisted and braided again. Braiding clamp 2, rotatable clamp 18, or movable clamp 12 may be used to accomplish this. Alternatively, a separate clamping member may be used to braid the drain wires 1b at the same time the cores 1a are separated from each other.

Figure 12:
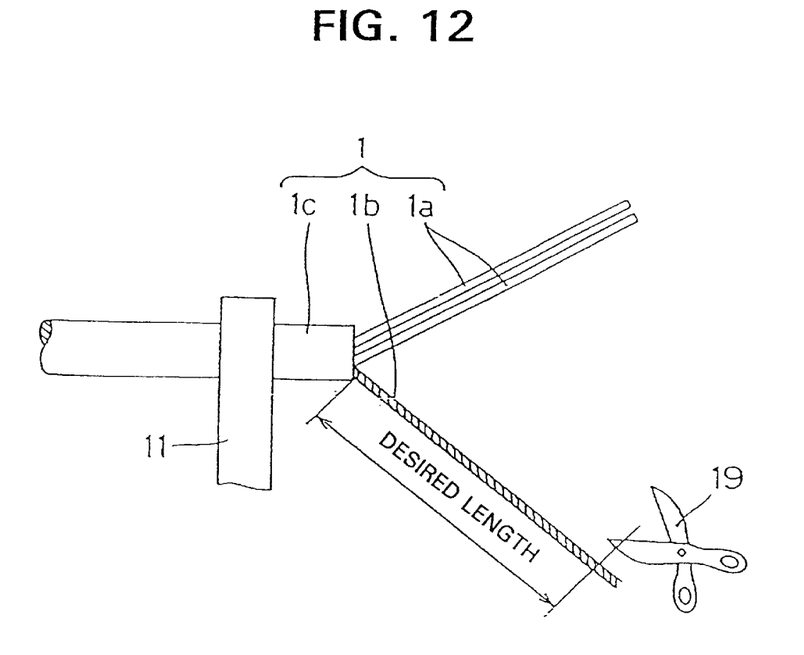
FIGS. 12 and 13 are schematic front views showing the cutting of the drain wires.
Figure 13:
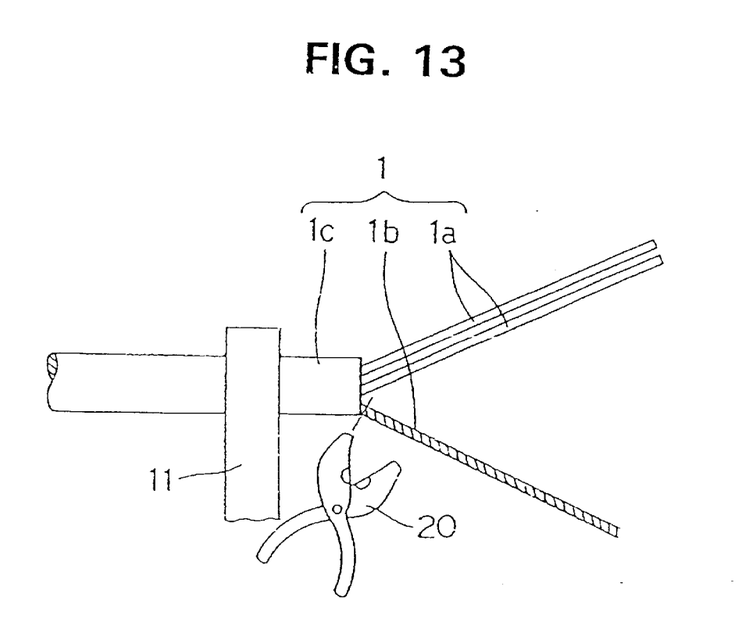

Braided drain wires 1b are cut to the desired measured length as needed (FIG. 12) or cut at the end of sheath ic (FIG. 13). In this way, processing of the end of shielded cable 1 is completed. To cut drain wires 1b, scissors 19 for cutting metal wires as shown in FIG. 12 or pliers 20 as shown in FIG. 13 are among the devices which may be used.

The foregoing is merely an exemplary preferred embodiment of the Invention, and such changes as would occur to the person of ordinary skill may be made without departing from the spirit thereof. For example, processing carried out primarily by an operator may be effected by machines, thereby automating the procedure. In such a case, it can easily be seen that the various steps can be performed with much simpler equipment than that known in the prior art.

While only a single embodiment of the present Invention has been expressly described, it is, nonetheless, to be broadly construed and not to be limited except by the character of the claims appended hereto.

What we claim is:

1. A method for processing a shielded cable, said cable comprising at least two cores, twisted together, a plurality of drain wires surrounding said cores, and an insulating sheath surrounding said drain wires, said method comprising cutting said sheath adjacent one end of said cable, and moving the cut sheath toward said end to form a scrap sheath, which is adjacent said end, and a body, which is remote from said end, said drain wires being exposed between said scrap sheath and said body, loosening said drain wires from around said core of said shielded cable to form expanded wires, and separation of said core from said expanded wires, said separation comprising rotating said cores about longitudinal axis in a loosening direction, thereby untwisting said cores.

2. The method of claim 1 wherein said separation comprises insertion of a plate having a width greater than its thickness between said expanded wires, said width being substantially parallel to said longitudinal axis of said cable.

3. The method of claim 1 wherein, subsequent to said untwisting, insertion of a plate having a width greater than its thickness between said expanded wires, said width being substantially parallel to said longitudinal axis of said cable, rotation of said plate about a plate axis which is not parallel to said longitudinal axis, thereby exposing said core.

4. The method of claim 3 wherein said plate axis is substantially perpendicular to said longitudinal axis.

5. The method of claim 3 wherein, subsequent to being rotated, said plate is withdrawn from said drain wires, leaving a space between said core and said drain wires.

6. The method of claim 1 wherein there are two plates, inserted from opposite sides of said cable.

7. The method of claim 1 wherein said loosening is effected by moving said scrap sheath toward said body along said longitudinal axis.

8. The method of claim 1 wherein, after said separation, said drain wires are braided.

9. The method of claim 8 wherein, after said wires are braided, they cut off a predetermined length.

* * * * *